UNITED STATES PATENT OFFICE.

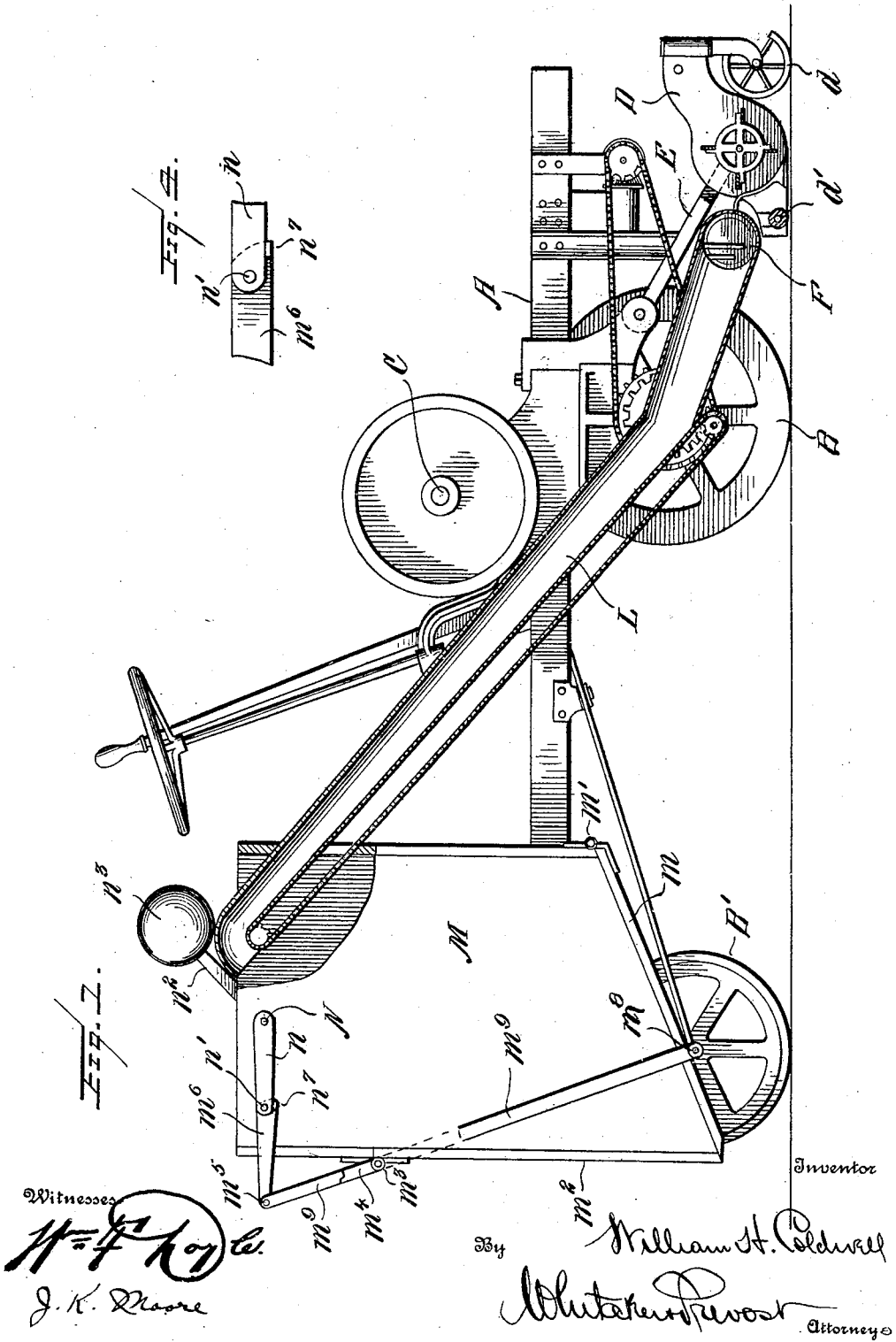

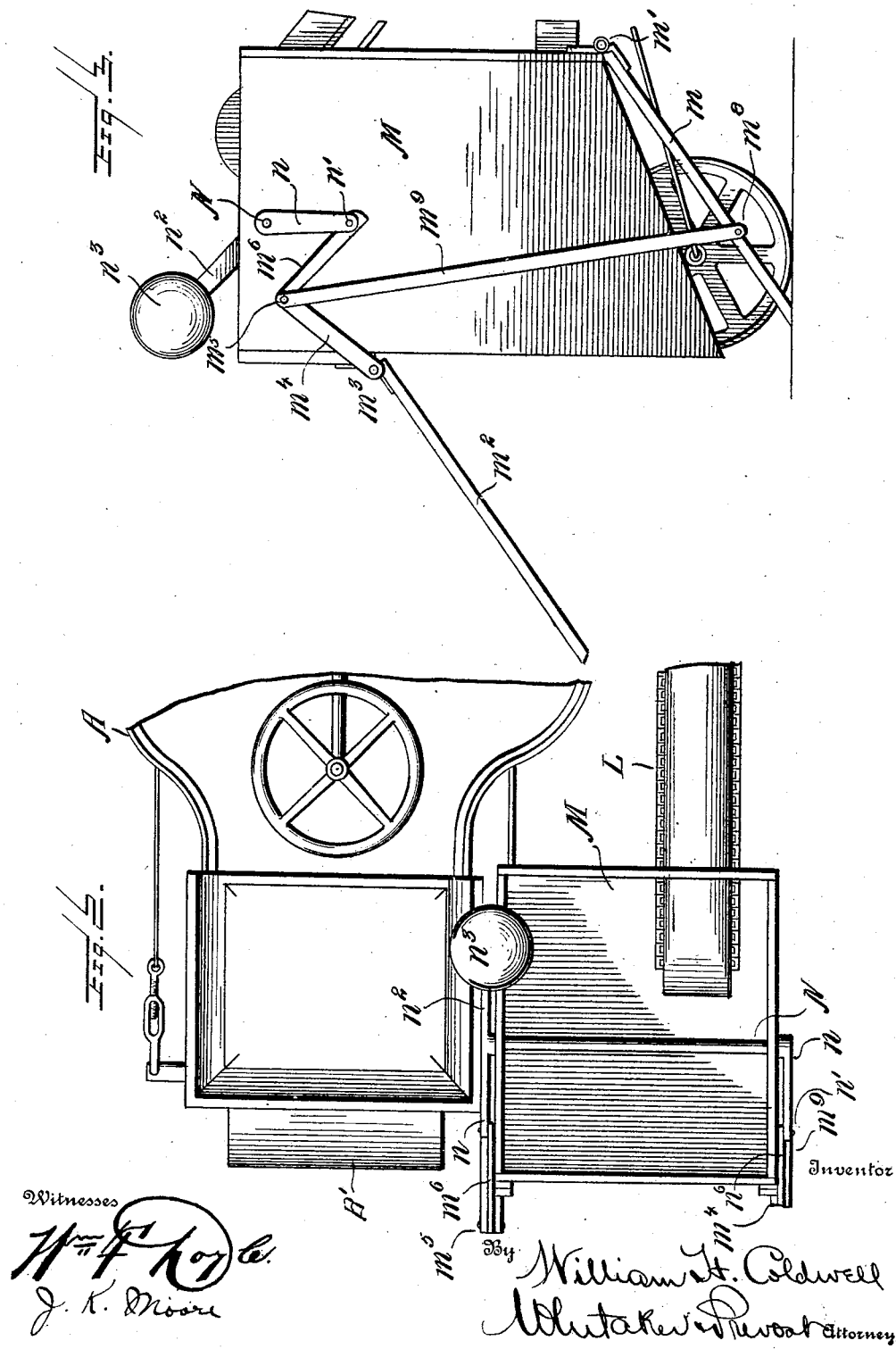

WILLIAM H. COLDWELL, OF NEWBURGH, NEW YORK.

LAWN-MOWER.

No. 865,331.  Specification of Letters Patent.  Patented Sept. 3, 1907.

Original application filed February 20, 1907, Serial No. 358,381. Divided and this application filed April 30, 1907. Serial No. 371,057.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn mowers and consists in the novel features hereinafter described, reference being had to the accompanying drawings which illustrate one form in which I have contemplated embodying the invention and my said invention is fully disclosed in the following description and claims.

Referring to the said drawings, Figure 1 is a side elevation of a motor lawn mower embodying my invention, parts being represented in section. Fig. 2 is a top plan view of part of the mower showing the grass box. Fig. 3 is a side elevation of the grass box showing doors open to discharge the contents. Fig. 4 is a detail of the door controlling mechanism.

This application is a division of my former application for Letters Patent of the United States No. 358,381, filed Feb. 20, 1907, and relates particularly to the construction of the grass box for receiving the cut grass, and the means for supporting and operating the discharging doors thereof, shown and described but not claimed in said former application.

I have illustrated my present invention in connection with a motor lawn mower, which is provided adjacent to and preferably in rear of the cutting mechanism with a trough or receptacle extending transversely of the machine, to receive the cut grass, and said trough or receptacle is provided with means for conveying the cut grass laterally or transversely of the machine and discharging it upon an elevator or conveyer, which carries it upward and delivers it into the grass box carried on the frame of the machine. The grass box has a capacity considerably greater than the aforesaid trough or receptacle, and is provided with a hinged bottom and end or side, forming discharge doors for quickly emptying the grass box at intervals, thus permitting the cut grass to be dumped in large quantities and facilitating its removal from the lawn. The doors are provided with supporting and operating devices by means of which they are normally locked in closed position, but may be readily opened by the operator from the driver's seat of the mower, when desired.

It is to be understood that the particular form of grass box herein shown, described and claimed, may also be employed in connection with horse or hand operated lawn mowers, and that any other suitable means for delivering the cut grass into said grass box may be employed in connection with it.

In the drawings A represents the motor frame of a motor lawn mower, supported by a front lawn rolling roller (or rollers) B, and a rear lawn rolling and steering roller B'. C represents the main shaft of the motor (not shown) which is preferably a gasolene motor, and is mounted on the frame A and propels the machine over the ground and also drives the cutting mechanism and other working parts of the machine. D is the mower frame which extends in front of the motor frame, is supported upon caster wheels $d$ and guard roller $d'$, and carries the cutting mechanism. The mower frame is pushed ahead of the motor frame by connecting push arms E. F represents the trough or receptacle in rear of the cutting mechanism, provided with feeding mechanism for conveying the grass transversely of the machine, and L is a conveyer which receives the cut grass from the said receptacle and carries it up and deposits it into the grass box M. These devices form no part of my present invention and need not be more particularly described.

The grass box M is provided with a bottom $m$ hinged at $m'$ at its forward edge, and when closed, normally lies in a downwardly inclined position from front to rear. The rear wall of the grass box is also provided with a hinged lower portion or door $m^2$, hinged at $m^3$, and having its lower edge meeting the rear edge of the hinged bottom $m$. The rear door is provided, preferably at each side with an operating arm $m^4$ rigidly secured thereto and extending upwardly and rearwardly from the hinge $m^3$, where it is pivoted at $m^5$ to one end of a link $m^6$, the other end of which is pivoted at $n'$ to a crank $n$, on a tripping shaft N, extending across the grass box, the link $m^6$ and crank arm $n$ being in a straight line between the pivot $m^5$ and crank shaft N when the doors are closed, and thus preventing the arm $m^4$ from moving forward. The shaft N is provided at one side (or both sides) with an arm $n^2$ carrying a weight $n^3$. The crank shaft is provided with some form of stop for limiting the movement of the weighted lever, when the parts are in the position shown in Fig. 1 and this is conveniently effected by providing one of the parts $m^6$ or $n$ with a lug $m^7$ in this instance formed on the part $m^6$ so that the joint at $n^1$ will not bend in an upward direction as indicated in detail in Fig. 4, but this result may be accomplished in other ways.

The movable bottom $m$ is provided with a bail comprising in this instance a cross bar $m^8$, and two side links or rods $m^9$ $m^9$ which are arranged to lie exactly in line with the arms $m^4$, and the hinge $m^3$ when the bottom is in closed position and are connected at their upper ends, to the pivots $m^5$ as shown in Fig. 1. It will, therefore, be seen that when the door $m^2$ and bottom $m$ are in closed position the rear door $m^2$ is held locked by the crank arm $n$ and link $m^6$, being in a straight line to shaft N, and the bottom $m$ is similarly locked in closed position since the downward pull on the side bars or links $m^9$ $m^9$ is directly upon the hinges $m^3$ through the arms $m^4$.

To discharge the contents of the grass box, it is only necessary to rock the weighted arm $n^2$ rearwardly, when the parts assume the positions shown in Fig. 3, the bottom $m$ being lowered to the ground and the rear door being opened outwardly and rearwardly, thus facilitating the quick discharge of the contents of the box or receptacle.

What I claim and desire to secure by Letters Patent is:—

1. The combination with a receptacle having its bottom and one side provided with hinged discharging doors, disposed angularly to each other and having their free ends meeting when in closed position, of an arm connected to one of said doors adjacent to its hinge connection and a supporting link intersecting the axis of said hinge connection when the doors are closed and connected with said arm and with the other door, substantially as described.

2. The combination with a receptacle having its bottom and one side provided with hinged discharging doors, disposed angularly to each other and having their free ends meeting when in closed position, of an arm connected to one of said doors adjacent to its hinge connection and a supporting link intersecting the axis of said hinge connection when the doors are closed and connected with said arm and with the other door, and means for locking said arm for holding both doors in closed position, substantially as described.

3. The combination with a receptacle having its bottom and one side provided with hinged discharging doors, disposed angularly to each other and having their free ends meeting when in closed position, of an arm connected to one of said doors adjacent to its hinge connection and a supporting link intersecting the axis of said hinge connection when the doors are closed and connected with said arm and with the other door, operating means connected with said arm for opening said doors simultaneously, and means for locking said arm to hold said doors in closed position, substantially as described.

4. A grass box for a lawn mower having a hinged bottom, and a hinged door located in one of its side walls, and having its free end adjacent to the free end of said hinged bottom, when both are in closed position, a vertically disposed link connected to said bottom, and extending normally above and intersecting the axis of the hinge of said door, and an arm connected to said door, and extending therefrom in line with said link, and pivotally connected to said link, whereby, when said door is in closed position, the bottom is also held in closed position, substantially as described.

5. A grass box for a lawn mower having a hinged bottom, and a hinged door, located in one of its side walls, and having its free end adjacent to the free end of said hinged bottom when both are in closed position, a vertically disposed link connected to said bottom, and extending normally above and intersecting the axis of the hinge of said door, and an arm connected to said door, and extending therefrom in line with said link, and pivotally connected to said link, whereby when said door is in closed position the bottom is also held in closed position, a crank shaft provided with a crank, a link connecting said crank to the said operating arm, and means for operating said crank shaft to open and close said door and bottom simultaneously, substantially as described.

6. A grass box for a lawn mower, having a hinged bottom, and a hinged door located in one of its side walls, and having its free end adjacent to the free end of said hinged bottom, when both are in closed position, a vertically disposed link connected to said bottom, and extending normally above and intersecting the axis of the hinge of said door, and an arm connected to said door, and extending therefrom in line with said link, and pivotally connected to said link, whereby when said door is in closed position the bottom is also held in closed position, a crank shaft provided with a crank, a link connecting said crank to the said operating arm, the pivoted connections of said link and crank lying in a straight line with the crank shaft when the door and bottom are in closed position and forming a lock for the same, and means for operating said crank shaft to open and close said door and bottom simultaneously, substantially as described.

7. A grass box for a lawn mower, having a hinged bottom, and a hinged door, located in one of its side walls, and having its free end adjacent to the free end of said hinged bottom, when both are in closed position, a vertically disposed link connected to said bottom, and extending normally above and intersecting the axis of the hinge of said door, and an arm connected to said door, and extending therefrom in line with said link, and pivotally connected to said link, whereby when said door is in closed position the bottom is also held in closed position, a crank shaft provided with a crank, a link connecting said crank to the said operating arm, the pivotal connections of said link and crank lying in a straight line with the crank shaft when the door and bottom are in closed position, and a weighted lever secured to said crank shaft, substantially as described.

In testimony whereof I affix my signature, in the presence of two witnesses.

WILLIAM H. COLDWELL.

Witnesses:
M. McBurney,
William T. Snider.